US009197605B2

(12) United States Patent
Shrinivasan et al.

(10) Patent No.: US 9,197,605 B2
(45) Date of Patent: Nov. 24, 2015

(54) SYSTEM AND METHOD FOR CONTROLLED ACCESS TO UP-TO-DATE PERSONAL INFORMATION

(71) Applicant: Vizio, Inc., Irvine, CA (US)

(72) Inventors: Sridhar Shrinivasan, Brentwood, MO (US); Subhasree K. Nangamangalam, Brentwood, MO (US)

(73) Assignee: Vizio, Inc, Irvine, CA (US)

( * ) Notice: Subject to any disclaimer, the term of this patent is extended or adjusted under 35 U.S.C. 154(b) by 271 days.

(21) Appl. No.: 13/862,432

(22) Filed: Apr. 14, 2013

(65) Prior Publication Data

US 2013/0238797 A1  Sep. 12, 2013

Related U.S. Application Data

(63) Continuation of application No. 13/312,071, filed on Dec. 6, 2011, now Pat. No. 8,423,642, which is a continuation of application No. 12/253,263, filed on Oct. 17, 2008, now Pat. No. 8,095,655, which is a continuation of application No. 11/300,668, filed on Dec. 13, 2005, now Pat. No. 7,441,031, which is a continuation-in-part of application No. 09/862,111, filed on May 21, 2001, now Pat. No. 7,010,599.

(51) Int. Cl.
*H04L 29/06* (2006.01)
*G06Q 10/10* (2012.01)
*H04L 29/12* (2006.01)
*G06F 21/62* (2013.01)

(52) U.S. Cl.
CPC ........ *H04L 63/0407* (2013.01); *G06F 21/6245* (2013.01); *G06Q 10/109* (2013.01); *H04L 29/0685* (2013.01); *H04L 29/06823* (2013.01); *H04L 29/06829* (2013.01); *H04L 29/06843* (2013.01); *H04L 61/1564* (2013.01)

(58) Field of Classification Search
CPC ................... H04L 29/06823; H04L 29/06829; H04L 29/06843; H04L 29/0685; H04L 61/1564; G06Q 10/109
See application file for complete search history.

(56) References Cited

U.S. PATENT DOCUMENTS

| | | |
|---|---|---|
| 5,133,075 A | 7/1992 | Risch |
| 5,539,813 A | 7/1996 | Jonsson et al. |
| 5,737,726 A | 4/1998 | Cameron et al. |
| 5,794,210 A | 8/1998 | Goldhaber et al. |
| 5,796,395 A | 8/1998 | De Hond |
| 5,831,611 A | 11/1998 | Kennedy et al. |

(Continued)

*Primary Examiner* — Le H Luu
(74) *Attorney, Agent, or Firm* — Law Office of Scott C Harris, Inc

(57) ABSTRACT

A method and system for controlling a recipient's access to a user's information. The method includes receiving a plurality of contact information, registration information and access information from the user. Only person's knowing the user's registration information can update the contact and access information of the user. The contact information entered by a user is about that user. The access information defines accessible sets of contact information to be made accessible to recipients. A telephone exchange is associated with each recipient; and a local server is associated with each telephone exchange. The accessible set of information is stored in the local server for access by the recipient. The system handles updates to information on the local servers when a user updates their contact information. The system can automatically place calls for a recipient to a user that has granted the recipient access to a number for communicating with the user.

31 Claims, 7 Drawing Sheets

(56) References Cited

U.S. PATENT DOCUMENTS

| | | | |
|---|---|---|---|
| 5,835,087 A | 11/1998 | Herz et al. | |
| 5,918,227 A | 6/1999 | Polnerow et al. | |
| 6,115,709 A | 9/2000 | Gilmour et al. | |
| 6,269,369 B1 | 7/2001 | Robertson | |
| 6,324,541 B1 | 11/2001 | De L'Etraz et al. | |
| 6,345,288 B1 | 2/2002 | Reed et al. | |
| 6,678,698 B2 | 1/2004 | Fredell et al. | |
| 6,708,202 B1 | 3/2004 | Shuman et al. | |
| 6,889,213 B1 | 5/2005 | Douvikas et al. | |
| 7,010,599 B2 | 3/2006 | Shrinivasan et al. | |
| 7,441,031 B2 | 10/2008 | Shrinivasan et al. | |
| 2003/0069874 A1* | 4/2003 | Hertzog et al. | 707/1 |
| 2003/0093474 A1* | 5/2003 | Kakuta et al. | 709/204 |
| 2003/0154171 A1* | 8/2003 | Karp et al. | 705/78 |
| 2004/0190495 A1* | 9/2004 | White et al. | 370/352 |

* cited by examiner

SYSTEM AND METHOD FOR CONTROLLED ACCESS TO UP-TO-DATE PERSONAL INFORMATION

This application is a continuation of U.S. patent application Ser. No. 13/312,071 filed Dec. 6, 2011, which is a continuation application of U.S. patent application Ser. No. 12/253,263 filed Oct. 17, 2008, now U.S. Pat. No. 8,095,655 issued Jan. 10, 2012, which is continuation of U.S. patent application Ser. No. 11/300,668, filed Dec. 13, 2005, now U.S. Pat. No. 7,441,031 issued Oct. 21, 2008, which is a continuation-in-part of U.S. patent application Ser. No. 09/862,111, filed May 21, 2001, now U.S. Pat. No. 7,010,599 issued Mar. 7, 2006, the disclosure of which is herewith incorporated by reference in their entirety.

BACKGROUND OF THE INVENTION

Many people and organizations desire to share different contact information with other people and organizations. For example, a person may desire for a creditor to know his social security number and his home address but not his home telephone number. To extend the example, the person may have multiple creditors and may desire for all of the creditors to know his social security number and home address (but not his home telephone number). On the other hand, the person may desire for his employer(s) to know his home telephone number as well as his home address.

As another example, a person may desire for an old high school boyfriend to know her business address and telephone number (but not her home information) so that he may keep her apprised of any plans for a class reunion (without dropping by her apartment uninvited). Conversely, she may desire for some of her family members to know her home information (but not her business information) so that they may keep her apprised of any plans for a family reunion (without bothering her at the office).

As yet another example, a company may desire for its attorneys to have a direct office telephone number, a home telephone number, and a cell phone number for its Chief Executive Officer ("CEO"), while desiring for its suppliers to have only its shipping and mailing addresses and a telephone number for its purchasing department (without the CEO's direct contact information).

Historically, changes in contact information about one party have required individual notifications of numerous other interested parties such as, for example, employers, customers, family, friends, etc. Individual notifications have been subject to errors and omissions; and failures to promptly and accurately communicate changes in contact information to interested parties typically result in returned correspondence, misdirected shipping, lost business prospects, and other undesirable losses of time and/or money.

Thus, there is a need for a system and method that facilitates communication of changes in contact information for one party to other interested parties. Further, there is a need for a system and method that provides control over what particular contact information for one party is accessible to which other particular interested parties.

SUMMARY OF THE INVENTION

The present invention provides a method for controlling recipient's access to a first user's information over a communications network. The method includes receiving a plurality of contact information, registration information and access information from the first user over the communications network. Only the first user and person's knowing the registration information of the first user are allowed to enter or update the contact information and access information of the first user. The contact information entered by the first user is information about the first user. The access information defines a first accessible set of contact information about the first user that is to be made accessible to a first recipient. A first telephone exchange is associated with the first recipient; and a first local server computing device is associated with the first telephone exchange. The first accessible set of information about the first user is stored in the first local server computing device; and the first recipient can access the first accessible set of information about the first user stored in the first local server computing device.

The present invention comprises the following steps when the plurality of contact information about the first user is updated. The updated portion of the plurality of contact information about the first user is determined. The access information of the first user is then searched to determine any update recipients, which are recipients with access rights to part of the updated portion of the plurality of contact information about the first user. Then, for any update recipient, the system determines the local server computing device associated with the update recipient; and updates the set of the plurality of contact information about the first user accessible to the update recipient in the local server computing device associated with the update recipient.

The present invention can also place calls for a recipient. When the system receives a request from the first recipient to place a telephone call, the system checks the first local server computing device to determine a callable set of users, the callable set of users being users that have granted the first recipient access rights to a telephone number. The system then prompts the first recipient to select a user from the callable set of users; and places a call connecting the first recipient to the selected user. If the first recipient has been granted access rights to more than one telephone number of the selected user, the system prompts the first recipient to select a telephone number from the more than one telephone number of the selected user; and places a call connecting the first recipient to the selected person using the selected telephone number.

The features and advantages of the present invention described above, as well as additional features and advantages, will be readily apparent to those skilled in the art upon reference to the following detailed description and the accompanying drawings.

DETAILED DESCRIPTION OF EXEMPLARY EMBODIMENTS

As used throughout this disclosure and the claims, "contact information" means an alphanumeric address such as those presently used to send mail via the United States Postal Service ("USPS"), a telephone (or facsimile, or beeper) number such as those presently used by Public Switched Telephone Networks ("PSTN") and wireless telephone service providers, an e-mail address such as those presently used to send messages over the World Wide Web ("www") and the Internet, and/or any other visual or auditory word, number, symbol, and/or visual or auditory collection of words and/or numbers and/or symbols that a first person or entity may input into a communications network or system to initiate a communication with a second person or entity over the communications network or system. To this end, it is noted that "contact information" as used throughout this disclosure and the claims includes any signal or collection of signals which transmits, carries, or otherwise represents or includes any of the aforementioned forms of contact information.

As used throughout this disclosure and the claims, "access information" means any visual or auditory word, number, symbol, and/or visual or auditory collection of words and/or numbers and/or symbols that indicates which of a first user's contact information the first user desires to be accessible by a second user. To this end, it is noted that "access information" as used throughout this disclosure and the claims includes any signal or collection of signals which transmits, carries, or otherwise represents or includes any of the aforementioned forms of access information.

Figure 1:
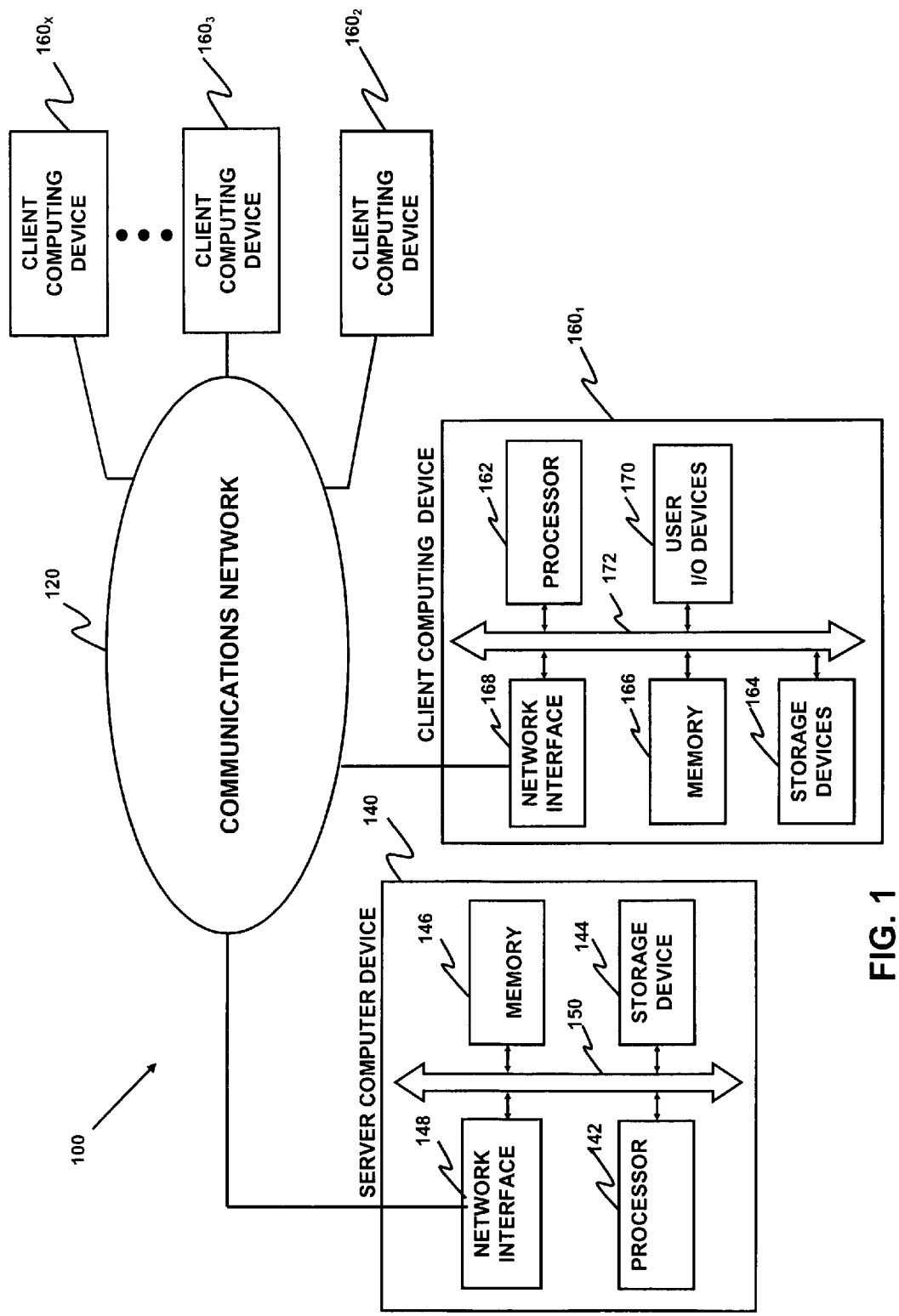
FIG. 1 is a block diagram of a system according to the present invention.

FIG. 1 is a block diagram of a system 100 according to the present invention. The system 100 includes a communications network 120, a server computing device 140, and at least one of a plurality of client computing devices (client computing device 160.sub.1, client computing device 160.sub.2, client computing device 160.sub.3, . . . client computing device 160.sub.x).

The communications network 120 operably couples the server computing device 140 to the at least one of the plurality of client computing devices such that the server computing device 140 and the at least one of the plurality of client computing devices may share information according to the present invention. To this end, the communications network 120 is the Internet, the World Wide Web, and/or any other suitable collection of devices that is connected to share information. It should be readily appreciated that the communications network 120 may include multiple public and/or private Local Area Networks ("LANs") and/or Wide Area Networks ("WANs") (not shown) that are operably coupled to one another via routers, switches, hubs, gateways, proxies, and/or firewalls (not shown). Additionally, it is noted that the communications network 120 may include a hardwired telephone network, a wireless telephone network, and/or a satellite network.

In general, the server computing device 140 is implemented with a server computer system or web server manufactured by Dell Computer Corporation of Round Rock, Tex., Gateway, Inc. of San Diego, Calif., or Compaq Computer Corporation of Houston, Tex. Further, the server computing device 140 may alternatively, or in addition, include network server appliances, server farms, server clusters, network accessible storage devices, and/or any other device suitable for executing operations according to the present invention. In the exemplary embodiment of FIG. 1, the server computing device 140 includes a processor 142, a storage device 144, memory 146, a network interface 148, and a system bus 150.

The processor 142 is generally operable to obtain software and/or firmware instructions from the storage device 144, load them into memory 146, and execute the instructions from memory 146. To this end, the processor 142 includes a single x86 processor from Intel or AMD. Alternatively, the processor 142 may include one or more processors utilizing very long instruction words, ("VLIW") code morphing, complex instruction set computer ("CISC"), reduced instruction set computer ("RISC"), single instruction/multiple data ("SIMD"), multiple instruction/multiple data ("MIMD"), or any other suitable architecture; and may be obtained from Compaq, National Semiconductor Corporation, Transmeta Corporation, or any other suitable vendor.

The storage device 144 is generally operable to store data and/or software instructions for the server computing device 140. To this end, the storage device 144 includes a hard disk drive, a floppy disk drive, a CD-ROM drive, a DVD-RAM drive, a RAID device, a Disk-On Chip device, and/or any other suitable computer readable and/or writeable media device. Additionally, the storage device 144 may include multiple media devices and may be distributed among several computing devices such as other servers of a server farm, other database servers, or other network accessible storage ("NAS") devices. Furthermore, the storage device 144 may store data in a number of different manners such as raw data to the media of the storage device 144, files in a file system of the storage device 144, and/or data, records, or objects in a database of the storage device 144. In the exemplary embodiment, the server computing device 140 transmits and receives information over the Internet according to the HyperText Transfer Protocol ("HTTP") and the Transmission Control Protocol/Internet Protocol ("TCP/IP") network protocol. To this end, the instructions in the storage device 144 include the Internet Information Server available from Microsoft Corporation, the Apache HTTP Server available from the Apache Group, the Zope web application server available from Digital Creations, Inc., or instructions for any other suitable HTTP server or web application server. It is noted, however, that the instructions in the storage device 144 may alternatively include instructions for FTP, TFTP, SMTP, or any other suitable transfer protocol and/or UDP, SMB, NetBUI, or any other suitable network protocol in addition to or instead of instructions for the HTTP protocol and the TCP/IP protocol.

Memory 146 stores data and instructions used by the processor 142. To this end, memory 146 includes standard random access memory for storing the data and software instructions needed by the processor 142. Alternatively, memory 146 may include other volatile memory types such as DRAM, SDRAM, and SRAM for storing data and software instructions and/or non-volatile memory such as ROMs, PROMs, EEPROMs, and flash memory for storing data and firmware instructions.

The network interface 148 operably couples the server computing device 140 to the communications network 120 such that the server computing device 140 may communicate with the at least one of the plurality of client computing devices that are also operably coupled to the communications network 120. To this end, the network interface 148 comprises a network interface controller such as an Ethernet controller or Token Ring controller that connects the server computing device 140 to the communications network 120 via a local area network, firewall, gateway, and/or router. Alternatively, or in addition, the network interface 148 may include an analog modem for use over Plain Old Telephone System ("POTS") telephone lines such as a 28.8K or 56K modem, a digital modem such as a Cable modem for use over a cable distribution network, an Integrated Services Digital Network ("ISDN") modem for use over an ISDN telephone line, or a Digital Subscriber Line ("DSL") modem for use over a DSL telephone line.

The system bus 150 is generally operable to interconnect the processor 142, the storage device 144, memory 146, and the network interface 148, and to enable these components of the server computing device 140 to communicate with one another. To this end, the system bus 150 is implemented with one or more of the PCI, ISA, and VME bus architectures, or any other suitable bus architecture(s). In the exemplary embodiment, the system bus 150 includes a separate address bus and data bus; however, in alternative embodiments, the address bus and data bus need not be separated.

In any event, it is noted that the above described components of the server computing device 140 are merely exemplary, and in alternative embodiments those skilled in the art may elect to replace all or portions of these components with suitable discrete analog circuit components, discrete digital circuit components, integrated analog circuits, integrated digital circuits, and/or integrated analog/digital hybrid circuits without undue experimentation.

As a result of executing the instructions read from memory 146, the processor 142 controls the general operation of the server computing device 140. More specifically, pursuant to the instructions read from memory 146, the processor 142 causes the server computing device 140 to receive a plurality of contact information from the at least one of the plurality of client computing devices over the communications network 120, receive access information from the same or any different one of the plurality of client computing devices over the communications network 120, and selectively transmit at least some of the plurality of contact information to at least one of the plurality of client computing devices over the communications network 120 based at least in part on the access information. Further details regarding exemplary operations of the server computing device 140 are discussed below.

Next, those of the plurality of client computing devices included in the system 100 are configured and coupled to the communications network 120 in a like manner to the client computing device 160.sub.1. So, for clarity of exposition, the exemplary embodiment of FIG. 1 is further described below with particular reference to the client computing device 160.sub.1. In general, the client computing device 160.sub.1 is implemented with a personal computer system, a desktop computer system, and/or a workstation manufactured by Dell Computer Corporation of Round Rock, Tex., Gateway, Inc. of San Diego, Calif., and Compaq Computer Corporation of Houston, Tex. Further, the client computing device 160.sub.1 may alternatively, or in addition, include a handheld computer, a laptop computer, a set-top box, a network appliance, a gaming console and/or any other suitable network enabled (preferably Internet enabled) computing device. In the exemplary embodiment, the client computing device 160.sub.1 includes a processor 162, a storage device 164, memory 166, a network interface 168, one or more user I/O devices 170, and a system bus 172.

The processor 162 is generally operable to obtain software and/or firmware instructions from the storage device 164, load them into memory 166, and execute the instructions from memory 166. To this end, the processor 162 includes a single x86 processor from Intel or AMD. Alternatively, the processor 162 may include one or more processors utilizing VLIW, code morphing, CISC, RISC, SIMD, MIMD, or any other suitable architecture; and may be obtained from Compaq, National Semiconductor Corporation, Transmeta Corporation, or any other suitable vendor.

The storage device 164 is generally operable to store data and/or software instructions for the client computing device 160.sub.1. To this end, the storage device 164 may include a hard disk drive, a floppy disk drive, a CD-ROM drive, a DVD-RAM drive, a RAID device, a Disk-On Chip device and/or other suitable computer readable and/or writeable media device. Additionally, the storage device 164 may include multiple media devices and may be distributed among several computing devices or other network accessible storage NAS devices. Furthermore, the storage device 164 may store data in a number of different manners such as raw data to the media of the storage device 164, files in a filesystem of the storage device 164, and/or data, records, or objects in a database of the storage device 164. In the exemplary embodiment, the client computing device 160.sub.1 transmits and receives the information over the Internet according to the HTTP protocol and the TCP/IP network protocol. To this end, instructions in the storage device 164 include the Internet Explorer web browser, available from Microsoft Corporation of Redmond, Wash.; the Netscape Communicator web browser, available from Netscape Communications Corporation of Mountain View, Calif.; or instructions for any other suitable web browser. Standard web browsers are generally operable to send and receive packets of information that conform to the HTTP and the TCP/IP protocols, send requests for Hyper-Text Markup Language ("HTML") documents, receive HTML documents, display HTML documents, and send data that a user has input into a HTML form.

Additionally, standard web browsers typically provide mechanisms which enable remote computer systems such as the server computing device 140 to cause the client computing device 160.sub.1 to execute software routines. For example, many web browsers support execution of Java Applets, JavaScript, ActiveX Controls, and other types of software technologies by which the server computing device 140 may cause the client computing device 160.sub.1 to execute software routines in response to information received from the server computing device 140. Also, standard web browsers typically include the ability to determine whether a particular software component such as an ActiveX Control, a plug-in application, or a Java Applet is already installed on the client computing device 160.sub.1 in response to information received from a server computing device 140. Further, standard web browsers typically include the ability to determine the version of such installed software components. Standard web browsers also typically include the ability to download and install a software component such as an ActiveX Control, a plug-in application, or a Java Applet from the server computing device 140 in response to information received from the server computing device 140. Standard web browsers also generally include the ability to cache information received from the server computing device 140 and determine whether the information in the cache is up-to-date with corresponding information of the server computing device 140. In this manner, the web browser of the client computing device 160.sub.1 can prevent the repetitive transfer of the same information from the server computing device 140 to the client computing device 160.sub.1. In other words, if the client computing device 160.sub.1 requests a particular resource from the server computing device 140 and the client computing device 160.sub.1 already has a copy of that resource in the cache, then the web browser can cause the client computing device 160.sub.1 to use the cached version of the resource, thus eliminating a transfer of the resource from the server computing device 140 to the client computing device 160.sub.1.

It is noted, however, that in alternative embodiments, the web browser may not include all of the aforementioned features. Moreover, in alternative embodiments the web browser functions may be implemented as a native custom application of the client computing device 160.sub.1 that is specifically designed for the system 100. The custom application may be implemented to display HTML and other markup language documents in a manner similar to a standard web browser, but need not include all of the features of a standard web browser. Further, in alternative embodiments the custom application may be implemented to receive information from the server computing device 140 in a non-markup language format, and to display the information via a customized graphical interface.

Memory 166 stores data and instructions used by the processor 162. To this end, memory 166 includes standard random access memory for storing the data and software instructions needed by the processor 162. Alternatively, memory 166 may include other volatile memory types such as DRAM, SDRAM, and SRAM for storing data and software instructions and/or non-volatile memory such as ROMs, PROMs, EEPROMs, and flash memory for storing data and firmware instructions.

Additionally, it is noted that the client computing device 160.sub.1 may alternatively be implemented with memory chips and/or other suitable hardware such that the same hardware implements both the storage device 164 and memory 166. Many handheld computing devices (e.g. Palm Pilots), Internet enabled cellular phones, and other special purpose computing devices are implemented in such a manner. It should be readily appreciated that any such device may be used to implement the client computing device 160.sub.1.

The network interface 168 operably couples the client computing device 160.sub.1 to the communications network 120 such that the client computing device 160.sub.1 may communicate with the server computing device 140 via the communications network 120. To this end, the network interface 168 comprises an analog modem for use over POTS telephone lines such as a 28.8K or 56K modem, a digital modem such as a cable modem for use over a cable distribution network, an ISDN modem for use over an ISDN telephone line, or a DSL modem for use over a DSL telephone line. Alternatively, or in addition, the network interface 168 may include a network interface controller such as an Ethernet controller or Token Ring controller that can be used to connect the client computing device 160.sub.1 to the communications network 120 via a local area network, firewall, gateway, and/or router.

The client computing device 160.sub.1 also includes one or more user I/O devices 170. In general, the user I/O devices 170 provide a user of the client computing device 160.sub.1 with mechanisms for entering information into the client computing device 160.sub.1, receiving information from the client computing device 160.sub.1, and/or controlling the operation of the client computing device 160.sub.1. To this end, the user I/O devices 170 may include cathode ray tubes ("CRT"), liquid crystal displays ("LCDs"), light emitting diodes ("LEDs"), printers, and/or other output devices that are operable to visually present information to a user of the exemplary client computing device 160.sub.1. The user I/O devices 170 may also include sound cards, wave generators, sequencers, mixers, speakers, and/or other audio devices that are used to audibly present information to a user of the exemplary client computing device 160.sub.1. Further, the user I/O devices 170 may include a mouse, a keyboard, a touch pad, a push button, a scanner, a stylus, a touch screen, a diskette drive, a compact disc read-only-memory ("CDROM") drive, and/or other input devices that provide a user of the exemplary client computing device 160.sub.1 with an interface to directly control the operation of the client computing device 160.sub.1 and/or indirectly control the operation of the server computing device 140. In the exemplary embodiment, the user I/O devices 170 are operable to display HTML documents and HTML forms. However, in alternative embodiments the user I/O devices 170 may display documents in SGML, XML, Tex, LaTeX and/or other suitable markup language formats.

The system bus 172 is generally operable to enable the various components of the client computing device 160.sub.1 to communicate with one another. To this end, the system bus 172 may be implemented with one or more of the PCI, ISA, and VME architectures, or any other suitable bus architecture(s). In the exemplary embodiment, the system bus 172 includes bus lines and/or traces which interconnect the processor 162, the storage device 164, memory 166, the network interface 168, and the user I/O devices 170.

In any event, it is noted that the above described components of the client computing device 160.sub.1 are merely exemplary, and in alternative embodiments those skilled in the art may elect to replace all or portions of these components with suitable discrete analog circuit components, discrete digital circuit components, integrated analog circuits, integrated digital circuits, and/or integrated analog/digital hybrid circuits without undue experimentation.

As a result of executing the instructions read from memory 166, the processor 162 controls the general operation of the client computing device 160.sub.1. More specifically, pursuant to the instructions read from memory 166, the processor 162 causes the client computing device 160.sub.1 to transmit a plurality of contact information to the server computing device 140 over the communications network 120, transmit access information to the server computing device 140 over the communications network 120, and receive at least some of the plurality of contact information from the server computing device 140 over the communications network 120. Further details regarding exemplary operations of the client computing device 160.sub.1 are discussed below.

Figure 2:
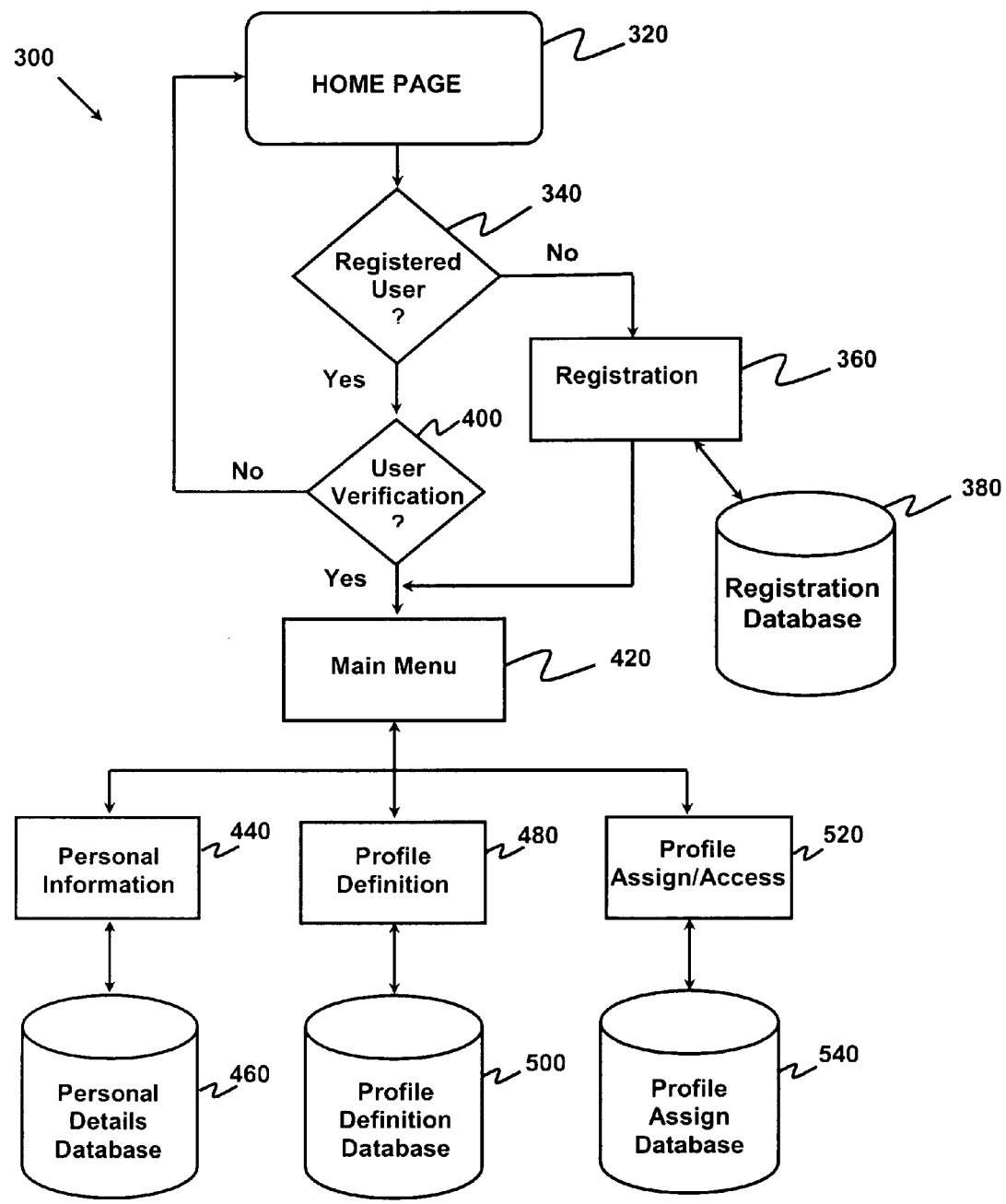
FIG. 2 is a flowchart of an exemplary method of operation according to the present invention.

FIG. 2 is a flowchart of an exemplary method of operation 300 according to the present invention. As noted above, those of the plurality of client computing devices included in the system 100 are configured and coupled to the communications network 120 in a like manner to the client computing device 160.sub.1. So, for clarity of exposition, the exemplary method of operation 300 is described below with particular reference to the client computing device 160.sub.1. Further, for clarity of exposition, the exemplary method of operation 300 is described below with particular reference to an exemplary embodiment of the system 100 in which the communications network 120 is the Internet.

At step 320, the system 100 executes "Home Page" operations. Here, a first user accesses a home page display via the user I/O devices 170 of the client computing device 160.sub.1 (see FIG. 1, discussed above). The first user directs the client computing device 160.sub.1 to initiate communications with the server computing device 140 by inputting the Uniform Resource Locator ("URL") for the server computing device 140 or by any other suitable manner. In any event, the client computing device 160.sub.1 obtains instructions from the server computing device 140 which cause the client computing device 160.sub.1 to execute the Home Page operations.

The home page display is similar in form and function to a typical Internet website home page. To this end, the client computing device 160.sub.1 displays welcoming messages to the user and displays a general description of the services provided by the present invention. In alternative embodiments, the Home Page operations may also suitably display commercial advertisements and/or otherwise provide advertising space that may be sold or leased to generate revenue for the owner of the present invention. After step 320 operations, the system 100 proceeds to step 340.

At step 340, the system 100 (through the user I/O devices 170 of the client computing device 160.sub.1) displays a query asking the first user whether the first user is a "registered user" of the present invention. A "registered user" is a user who has previously entered the requested "registration information" (discussed in more detail below). It should be readily appreciated that restricting access to the present invention to registered users may provide a source of revenue for the owner of the present invention in the form of one time registration fees and/or periodic subscription fees. In any event, if the first user indicates that the first user is a registered user, then the system 100 skips to step 400 (discussed further below); else, the system 100 proceeds to step 360.

At step 360, the system 100 executes "Registration" operations. Here, the system 100 (through the user I/O devices 170 of the client computing device 160.sub.1) prompts the first user to enter "registration information." The registration information suitably comprises an alphanumeric user identification name ("User ID") and security code (or "password"), both of the first user's arbitrary choosing. The client computing device 160.sub.1 transmits the User ID and password to the server computing device 140 via the communications network 120. In connection with the Registration operations, the server computing device 140 maintains a registration database (shown as step 380 operations). The server computing device 140 checks the contents of its registration database to ensure that the first user's registration information does not conflict with (i.e., is not the same as) any previously stored registration information. If the server computing device 140 detects a conflict, then the server computing device 140 notifies the client computing device 160.sub.1, which in turn notifies the first user and prompts the first user for non-conflicting registration information through the user I/O devices 170. The system 100 repeats the prompts for registration information, receipts of registration information, and conflicts checks until the first user enters non-conflicting registration information. When non-conflicting registration information is received, the server computing device 140 saves the User ID and password as associated data in the registration database (step 380 operations). After step 360 operations (and step 380 operations), the system 100 skips to step 420 (discussed further below).

At step 400, the system 100 executes "User Verification" operations. Here, the client computing device 160.sub.1 (through the user I/O devices 170) prompts the first user for the first user's User ID and password, which should have been received from the first user during a previous registration session (see step 360 operations, discussed above). The client computing device 160.sub.1 receives the User ID and password and transmits them to the server computing device 140 via the communications network 120. The server computing device 140 determines whether the User ID and password are valid (i.e., whether the User ID and password have been previously stored and associated with each other in the registration database). After the server computing device 140 determines that the User ID and password are valid (or "verified"), then the system 100 proceeds to step 420; else the system 100 loops back to Home Page operations (see step 320, discussed above).

At step 420, the system 100 executes "Main Menu" operations. Here, the server computing device 140 causes the client computing device 160.sub.1 to display a "main page" which presents links to "Personal Information" operations (see step 440, below), "Profile Definition" operations (see step 480, below), and "Profile Assign/Access" operations (see step 520, below). Via the user I/O devices 170, the first user selects which one of these sets of operations are to be executed by the system 100. The client computing device 160.sub.1 receives the first user's selection and transmits the selection to the server computing device 140. Upon receipt of the selection by the server computing device 140, the system 100 proceeds to the selected operations. In other words, the Main Menu operations provide a menu by which the first user can cause the system 100 to branch to the selected operations. In alternative embodiments, the Main Menu operations may also provide selections for e-mail services, Internet chat rooms, and/or other communications tools that may be desirable to the first user. Further, it should be readily appreciated that in alternative embodiments the Main Menu operations may also suitably provide advertising for others.

At step 440, the system 100 executes "Personal Information" operations. Here, the server computing device 140 causes the client computing device 160.sub.1 to prompt the first user for the first user's contact information, and other personal information that the first user may wish to make accessible to other registered users such as a list of special events (e.g., birthdays, wedding anniversary dates, employment service dates, etc.), miscellaneous demographic information (e.g., a social security number, a license plate number, a resume, a date of birth, a race, a sex, a family description, a home description, an income, etc.), and/or image data files from a diskette, CDROM, or other storage device. The image data files suitably comprise digitized photographs of the first user's family, for example. In any event, the client computing device 160.sub.1 receives the contact information and/or other personal information from the first user and transmits it to the server computing device 140 via the communication network 120. In connection with the Personal Information operations, the server computing device 140 maintains the contact information and/or other personal information in a personal details database (shown as step 460 operations). Further, during the Personal Information operations the system 100 also allows the first user to view, modify, and/or delete the first user's contact information and/or other personal information and to add new contact information and/or other personal information beyond that which may have already been stored in the personal information database during a prior use of the present invention. For instance, Personal Information operations allow a first user to input the first user's home address for the first time and then subsequently update/change the first user's home address after a move. After step 440 operations (and step 460 operations), the system 100 returns to the Main Menu operations (see step 420, discussed above).

At step 480, the system 100 executes "Profile Definition" operations. Here, the server computing device 140 causes the client computing device 160.sub.1 to display "profile definition" pages. Through the profile definition pages, the client computing device 160.sub.1 receives some access information from the first user as profile definition information and communicates the profile definition information to the server computing device 140 via the communications network 120. The profile definition information identifies a portion of the first user's contact information and/or other personal information, and identifies a relationship between the first user and a desired recipient or group of recipients of that portion of the information (see, for example, FIGS. 3 and 4, discussed below). In connection with the Profile Definition operations, the server computing device 140 maintains the profile definition information in a profile definition database (shown as step 500 operations). Further, the system 100 also allows the first user to view, modify, and/or delete the first user's profile definition information and to add new profile definition information beyond that which may have already been stored in the profile definition database during a prior use of the present invention. After step 480 operations (and step 500 operations), the system 100 returns to the Main Menu operations (see step 420, discussed above).

At step 520, the system 100 executes "Profile Assign/Access" operations. Here, the server computing device 140 causes the client computing device 160.sub.1 to display "profile assign/view" pages by which the client computing device 160.sub.1 receives profile assign/access information from the first user. The client computing device 160.sub.1 transmits the profile assign/access information to the server computing device 140 via the communications network 120. More particularly, via the Profile Assign/Access operations, the system 100 allows the first user to assign or link another registered user(s) to the first user's profile definition information. In other words, via the Profile Assign/Access operations, the system 100 receives further access information from the first user that specifies which other registered users are granted access to the particular portion(s) of the first user's contact information and/or other personal information that are identified by the first user's profile definition information. In connection with the Profile Assign/Access operations, the server computing device 140 maintains the profile assign/access information in a profile assign/access database (shown as step 540 operations). Further, the system 100 also allows the first user to view, modify, and/or delete the first user's profile assign/access information and to add new profile assign/access information beyond that which may have already been stored in the profile assign/access database during a prior use of the present invention.

Via the Profile Assign/Access operations, the system 100 also allows the first user to view and/or download the respective contact information and/or other personal information of other registered users who have assigned the first user to their respective profile definition information. After step 520 operations (and step 540 operations), the system 100 returns to the Main Menu operations (see step 420, discussed above).

Figure 3:
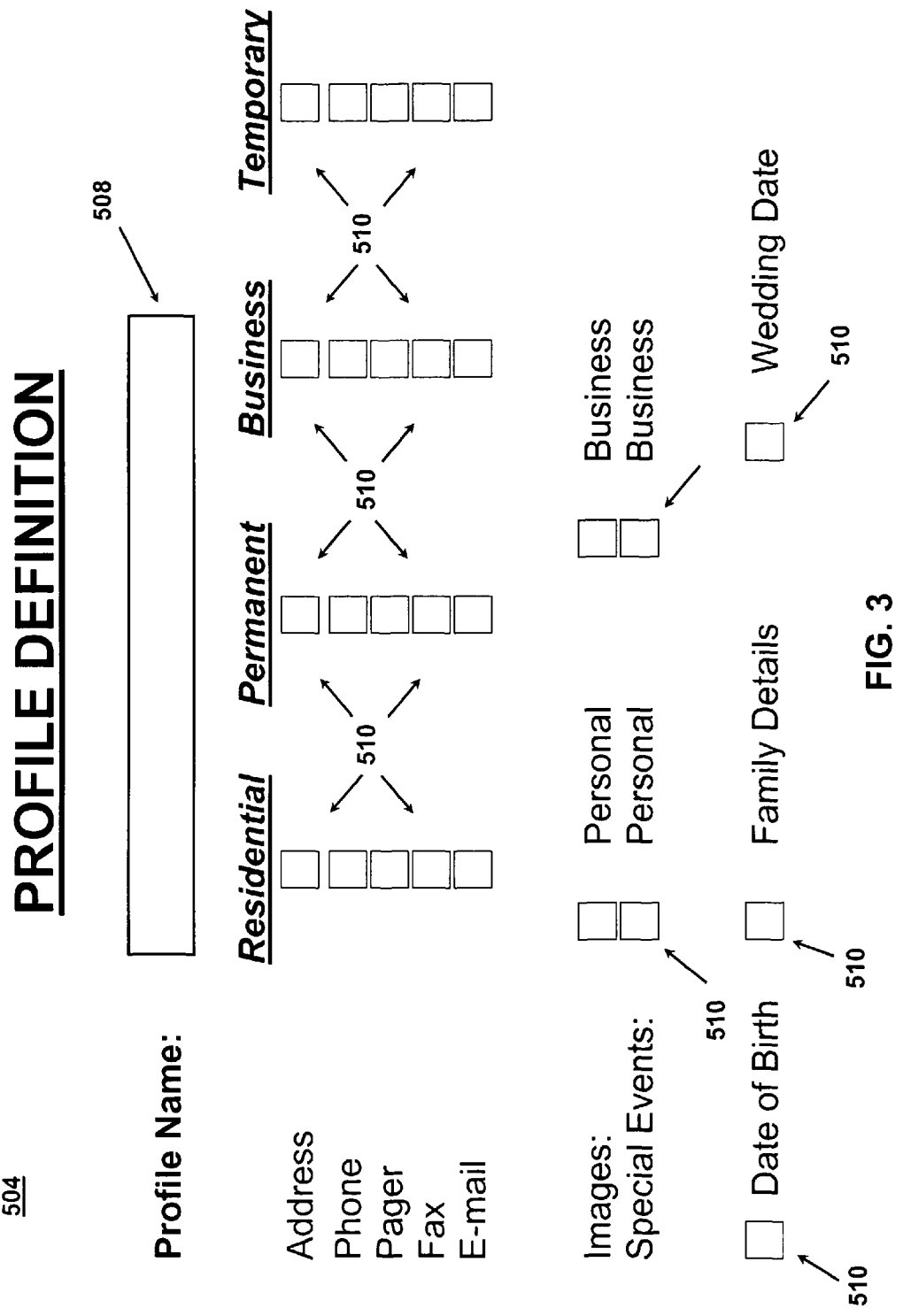
FIG. 3 is a depiction of an exemplary "blank" profile definition page according to the present invention.

FIG. 3 is a depiction of an exemplary "blank" profile definition page 504 (i.e., with no input yet from the first user) according to the present invention. In general, FIG. 3 depicts an exemplary page by which the system 100 allows the first user to select which of the first user's contact information and/or other personal information from the personal details database (see steps 440 and 460, discussed above) that the first user wishes to make accessible to other registered users whom the first user designates to be within the group or category of the named profile via the "Profile Assign/Access" operations (see step 520, discussed above).

According to the example depicted by FIG. 3, during Profile Definition operations (see step 480, discussed above) the system 100 allows the first user to assign an alphanumeric profile name of the first user's arbitrary choosing (such as, for example, "Friends", "Family", "Business Colleagues", "Schoolmates", etc.) to a profile by entering (via the user I/O devices 170 of the client computing device 160.sub.1) the desired name of the profile into a profile name field 508. Then, the first user inputs selections into the system 100 by entering an "X" into each of the respective selection boxes 510 of the profile definition page 504. To this end, it should be readily appreciated that FIG. 3 depicts boxes for indicating that particular residential (or present place of living) contact information such as address, phone number, pager number, fax number, and e-mail address are to be accessible by the other registered users within the named group (see the "Residential" column); further depicts boxes for indicating that particular permanent (or domicile) contact information such as address, phone number, pager number, fax number, and e-mail address are to be accessible by the other registered users within the named group (see the "Permanent" column); further depicts boxes for indicating that particular business contact information such as address, phone number, pager number, fax number, and e-mail address are to be accessible by the other registered users within the named group (see the "Business" column); further depicts boxes for indicating that particular temporary (e.g., vacation) contact information such as address, phone number, pager number, fax number, and e-mail address are to be accessible by the other registered users within the named group (see the "Temporary" column); further depicts boxes for indicating that personal and/or business images data (e.g., digitized pictures of that sky trip to Aspen) is to be accessible by the other registered users within the named group; further depicts boxes for indicating that personal and/or business special events information (e.g., high school graduation date, college graduation date, and/or other events) is to be accessible by the other registered users within the named group; and further depicts boxes for indicating that date of birth information, miscellaneous family details information, and/or wedding date information are to be accessible by the other registered users within the named group.

It should be readily appreciated that prior to the first user's selections, the system 100 has prompted the first user for and received the necessary contact information and/or other personal information from the first user via the "Personal Information" operations (see step 440, discussed above). These prompts suitably comprise, for example, a series of corresponding queries such as "What is your residential address?", "What is your residential telephone number?", etc.; or may suitably comprise a "personal information" page similar to the profile definition page 504 but with input fields for the necessary information in place of the selection boxes 510. In any event, it is noted that the profile definition page 504 and the prompts for the necessary information discussed herein are merely exemplary, and alternative embodiments of the present invention may include different page layouts, different queries, or any other suitable alternatives. Additionally, it is noted that the present invention is not limited to the specific contact information and/or other personal information depicted in FIG. 3 (or FIG. 4, discussed below).

Figure 4:
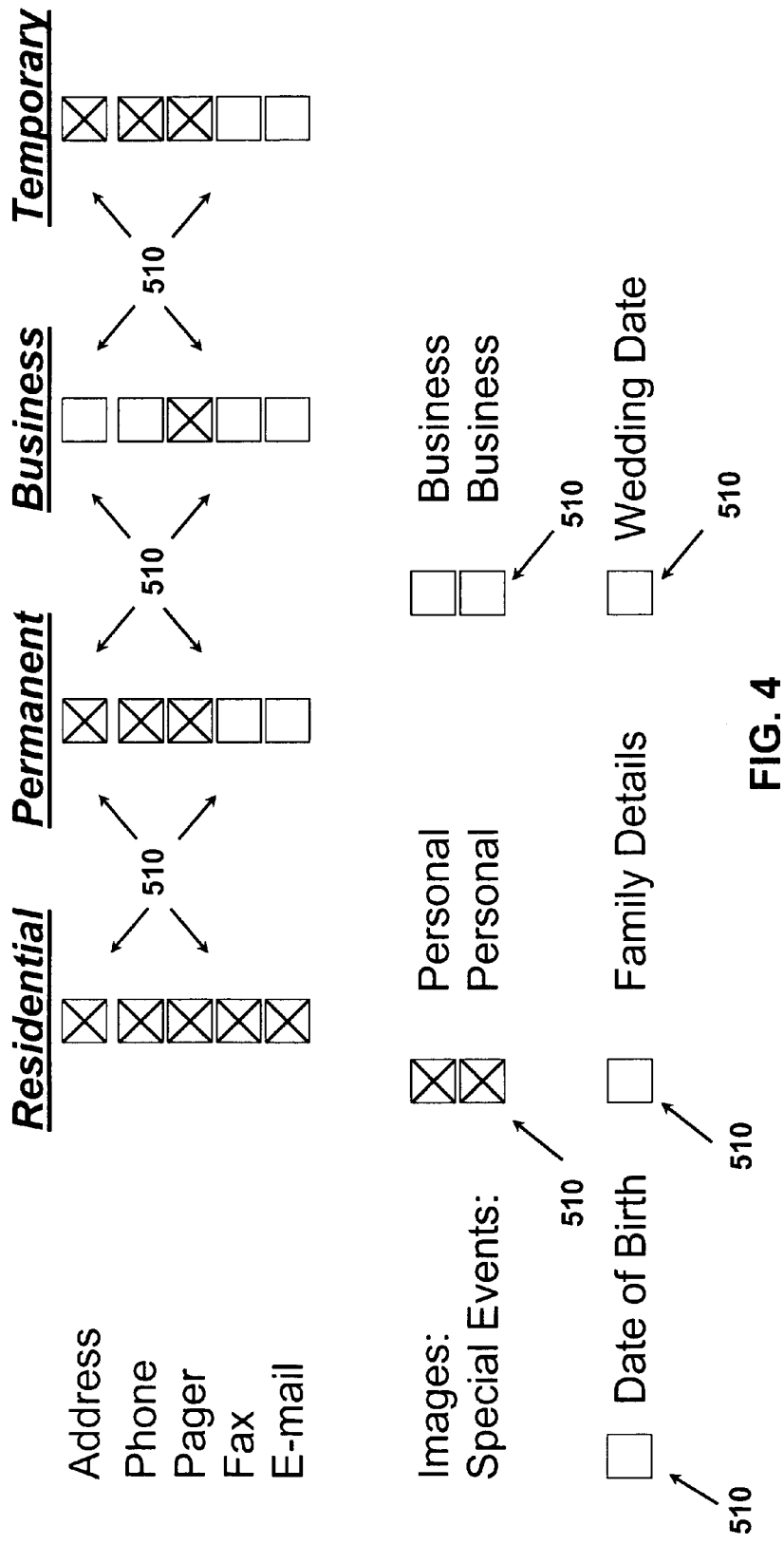
FIG. 4 is a depiction of an exemplary "completed" profile definition page according to the present invention.

FIG. 4 is a depiction of an exemplary "completed" profile definition page 514 (i.e., with a name entered in the profile name field 508 and selections indicated in the selection boxes 510) according to the present invention. The "completed" profile definition page 514 is displayed by the client computing device 160.sub.1. In the example depicted in FIG. 4, the first user has created a profile named "Friends." Further, the first user has indicated that all other registered users whom the first user designates as the first user's "Friends" via the "Profile Assign/Access" operations (see step 520, discussed above) shall have access to certain of the first user's contact and/or personal information from the personal details database, namely: the first user's residential address, permanent address, and temporary address; the first user's residential telephone number, permanent telephone number, and temporary telephone number; the first user's residential pager number, permanent pager number, business pager number, and temporary pager number; the first user's residential fax number; the first user's residential e-mail address; the first user's personal image data; and the first user's personal special events information. On the other hand, it should be readily appreciated that the system 100 does not allow the other users to access the various other information which the first user has not selected. The client computing device 160.sub.1 transmits the profile definition information (i.e., the profile name and the selections) to the server computing device 140 via the communications network 120.

Continuing the example discussed above in connection with FIGS. 3 and 4, during the Profile Assign/Access operations (see step 520, discussed above) the client computing device 160.sub.1 receives the first user's indication that "John Doe" (a second registered user) is one of the first user's "Friends" through the user I/O devices 170 of the client computing device 160.sub.1 via a "profile assignment" prompt which suitably includes a first entry field for receiving the profile name and a second entry field for receiving John Doe's (the other registered user's) User ID. Accordingly, the server computing device 140 updates its profile assign/access database to clear John Doe for access to the first user's particular contact and/or personal information from the first user's Friends profile, namely: the first user's residential address, permanent address, and temporary address; the first user's residential telephone number, permanent telephone number, and temporary telephone number; the first user's residential pager number, permanent pager number, business pager number, and temporary pager number; the first user's residential fax number; the first user's residential e-mail address; the first user's personal image data; and the first user's personal special events data (as discussed above in connection with FIG. 4). On the other hand, it should be readily appreciated that in the event that the first user has also setup another profile, for example, a "Business Colleagues" profile, the first user's assignment of John Doe to the first user's Friends profile does not clear John Doe for access to the information in the first user's Business Colleagues profile. To clear John Doe for access to any of the first user's profiles, the first user must assign John Doe to that respective profile.

Additionally, for example, when John Doe has assigned the first user to John Doe's "Friends" profile during a prior use of the present invention (where John Doe operated the invention in the role of a "first user" (see steps 440 and 480, discussed above), the first user suitably enters a request for the contact information of "John Doe" into the client computing device 160.sub.1 (via the user I/O devices 170). The client computing device 160.sub.1 transmits this request to the server computing device 140. In response to the request, the server computing device 140 causes the client computing device 160.sub.1 to indicate to the first user John Doe's particular contact information and/or other personal information which John Doe has included in John Doe's Friends profile.

Accordingly, it should be readily appreciated that the first user causes the system 100 to clear a second registered user for access to a respective plurality of the first user's profiles by making a plurality of respective profile assignments for the second user, thereby granting the second user access to a respective plurality of the first user's contact information. For instance, the first user may assign John Doe to a "Family" profile and/or a "Schoolmates" profile as well as or alternatively to the first user's Friends profile. Further, it should be readily appreciated that the first user repeats operations of the present invention as desired to similarly effectuate various profile assignments for a plurality of other registered users, and any of those or other registered users grants the first user access to their contact information and/or other personal information by designating the first user in their own profile assignments.

Thus, when a registered user of the present invention updates his or her contact information and/or other personal information, the present invention makes the updated information available to the other registered users (or registered "contacts") according to the registered user's profile definitions and assignments.

Figure 5:
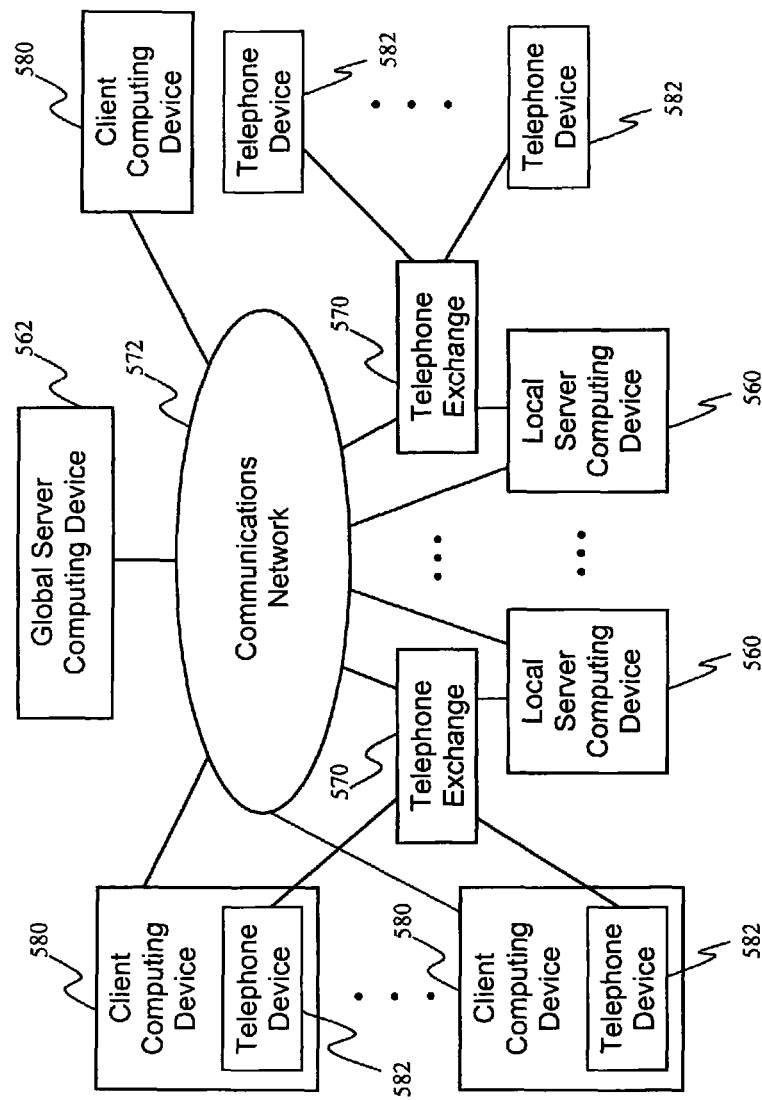
FIG. 5 is a block diagram of a system according to the present invention showing telephone exchanges and telephone devices.

FIG. 5 shows another exemplary embodiment of the contact information system that maintains current contact information for multiple users. The system utilizes a plurality of local server computing devices 560 and a global server computing device 562. The local server computing devices 560 and the global server computing device 562 are connected through a communications network 572, which could be the Internet, a wide or local are network or another type of communications network. Each of the plurality of local server computing devices 560 is associated with a local telephone exchange 570. The local server computing device 560 associated with a local telephone exchange 570 can be collocated with or remote from that local telephone exchange 570. The plurality of local telephone exchanges 570 are also interconnected through the communications network 572. The communications network 572 connecting the plurality of local telephone exchanges 570 with one another, and connecting the plurality of local server computing devices 560 and the global server computing device 562 can be comprised of multiple separate communication networks or a single communications network.

Each user of the contact information system has a client computing device 580 and/or a telephone device 582. The client computing device 580 and the telephone device 582 can be the same device or separate devices. Each of the client computing devices 580 is connected to the communication network 572 and each of the telephone devices 582 is connected to one of the local telephone exchanges 570. More than one user may be connected to the same local telephone exchange 570. It is noted that the client computing device 580 and the telephone device 582, whether integrated into one device or separate, may be implemented with various types of devices with limited or extensive computing power, some exemplary devices being computers, handheld computing devices, personal data assistants (PDAs), cellular phones, or regular landline telephones. By way of example but not limitation, some devices that can function as both a client computing device 580 and a telephone device 582 are some personal data assistants (PDAs) with telephone capability and cellular telephones.

Each of the local server computing devices 560 associated with a local telephone exchange 570 maintains a database of current up-to-date contact information that is accessible to the users and telephone devices 582 associated with that local telephone exchange 570. The global server computing device 562 maintains a global database of current up-to-date contact information for all of the users of the contact information system. The global server computing device 562 may comprise one or more servers that have the global database shared between them.

Figure 6:
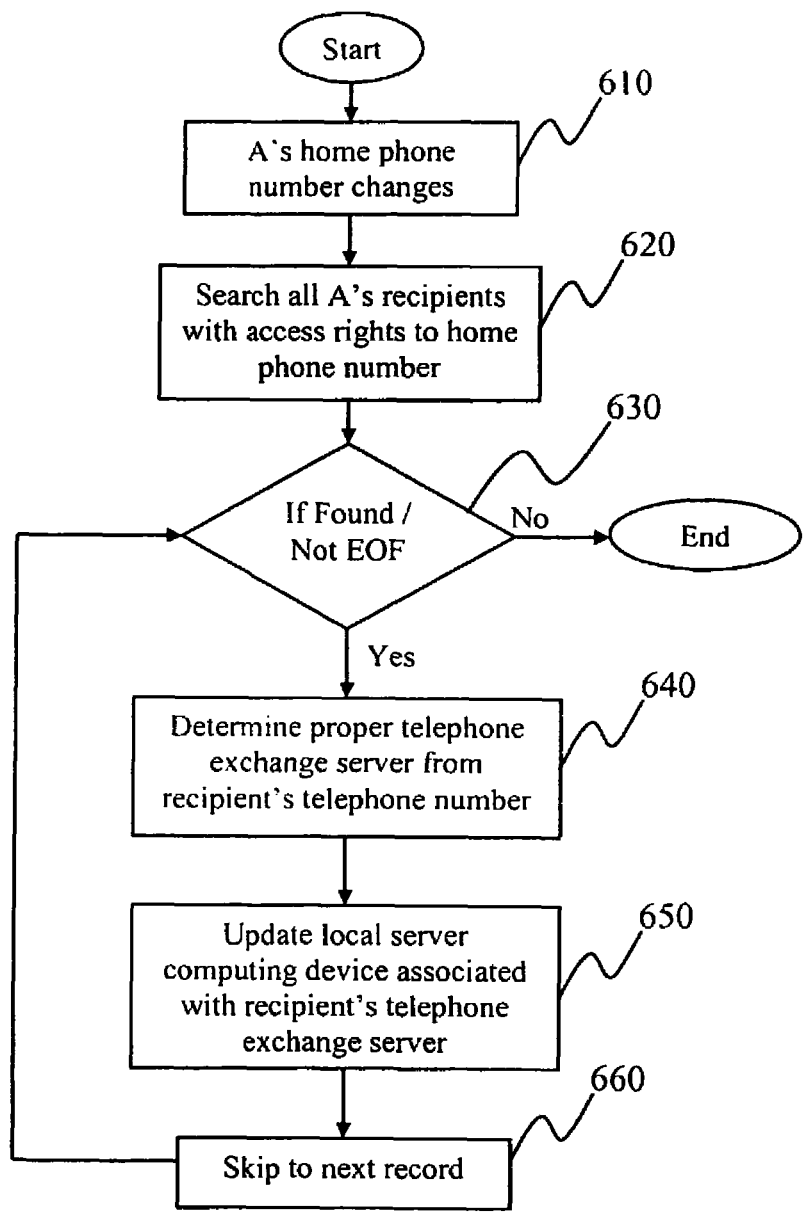
FIG. 6 is a flowchart of an exemplary method of the information update process.

FIG. 6 shows a flow diagram illustrating an example of the use of the contact information system. At step 610, User A or someone knowing the access information for User A enters a change to User A's home telephone number. The example would also apply to a change in any other telephone information of User A. User A or someone knowing the access information for User A accesses the contact information system, goes through the registration and/or verification process and enters the change to User A's home telephone number. One method of accessing the contact information system would be to dial a specific telephone number connecting the user to the contact information system for the entry and updating of user information. The change in User A's home telephone number is communicated through the communications network 572 to the global server computing device 562.

At step 620, the contact information system searches in the global contact database 562 for each of the recipients that have been granted access rights to User A's home telephone number.

At step 630, the contact information system checks whether any of the recipients with access rights to User A's home telephone number have not received the updated information ("non-updated recipients") or if the end of file (EOF) for the global contact database 562 has been reached. If all of the recipients with access rights to User A's home telephone number have been updated with User A's new telephone number, then the process is complete. However, if there are non-updated recipients with access rights to User A's home telephone number then the contact information system continues to step 640.

At step 640, the contact information system examines the personal information of the recipient that is stored in the global contact database 562, including the recipient's telephone number used to access the contact information system, to determine the local telephone exchange 570 for the recipient. If a recipient uses multiple telephone numbers to access the contact information system, and each of these telephone numbers is associated with a different telephone exchange 570, then more than one telephone exchange 570 would need to be updated for that recipient.

At step 650, the recipient's records in the database on the local server computing device 560 that is associated with the recipient's local telephone exchange 570 are updated with the new home telephone number for User A.

Then at step 660, the contact information system checks for the next recipient with access rights to User A's home telephone number and control loops back to step 630. This process continues until all of the recipients with access rights to User A's home telephone number have their records updated in the databases on the local server computing devices 560 associated with the telephone exchanges 570 of the recipients. The databases of some local server computing devices 560 may not be updated because there are no recipients with the associated telephone exchange 570 that have access rights to User A's home telephone number and/or that are registered for the contact information system.

As a specific example, assume the following situation. User A has three profiles: Business, Friend and Family; and has assigned Users B, C and D the access rights shown in the table below:

| Profile | Telephone Numbers Included in Profile | Users with Access to Profile |
|---|---|---|
| Business | Business telephone | User B |
| Friend | Home and cell telephone | User C |
| Family | Home, cell and business telephone | User D |

Also, assume that each telephone exchange 570 services one area code and the Users A-D are in the area codes shown in the following table:

| User | Telephone Exchange/ Area Code |
|---|---|
| A | 978 |
| B | 314 |
| C | 302 |
| D | 978 |

As a first example using the above scenario, we will again have User A's home telephone number change. User A or anyone knowing User A's access information can update the information in the contact information system. User A's home telephone number is changed in the database on the global server computing device 562 and the contact information system searches the recipients that have been granted access rights to User A's home telephone number. As shown in the above table, the search will reveal Users C and D have access right to User A's home telephone number. The contact information system will update User A's home telephone number in the local server computing device 560 associated with the telephone exchange 570 for area code 302 where User C has activated/subscribed the service. The contact information system will also update User A's home telephone number in the local server computing device 560 associated with the telephone exchange 570 for area code 978 where User D has activated/subscribed the service. User A's home telephone number may not be updated if the relevant user has not activated/subscribed to the service.

As a second example using the above scenario, we will have User A's business telephone number change. User A or anyone knowing User A's access information can update the information in the contact information system. User A's business telephone number is changed in the database on the global server computing device 562 and the contact information system searches the recipients that have been granted access rights to User A's business telephone number. As shown in the above table, the search will reveal Users B and D have access right to User A's business telephone number. The contact information system will update User A's business telephone number in the local server computing device 560 associated with the telephone exchange 570 for area code 314 where User B has activated/subscribed the service. The contact information system will also update User A's business telephone number in the local server computing device 560 associated with the telephone exchange 570 for area code 978 where User D has activated/subscribed the service. User A's business telephone number may not be updated if the relevant user has not activated/subscribed to the service.

Figure 7:
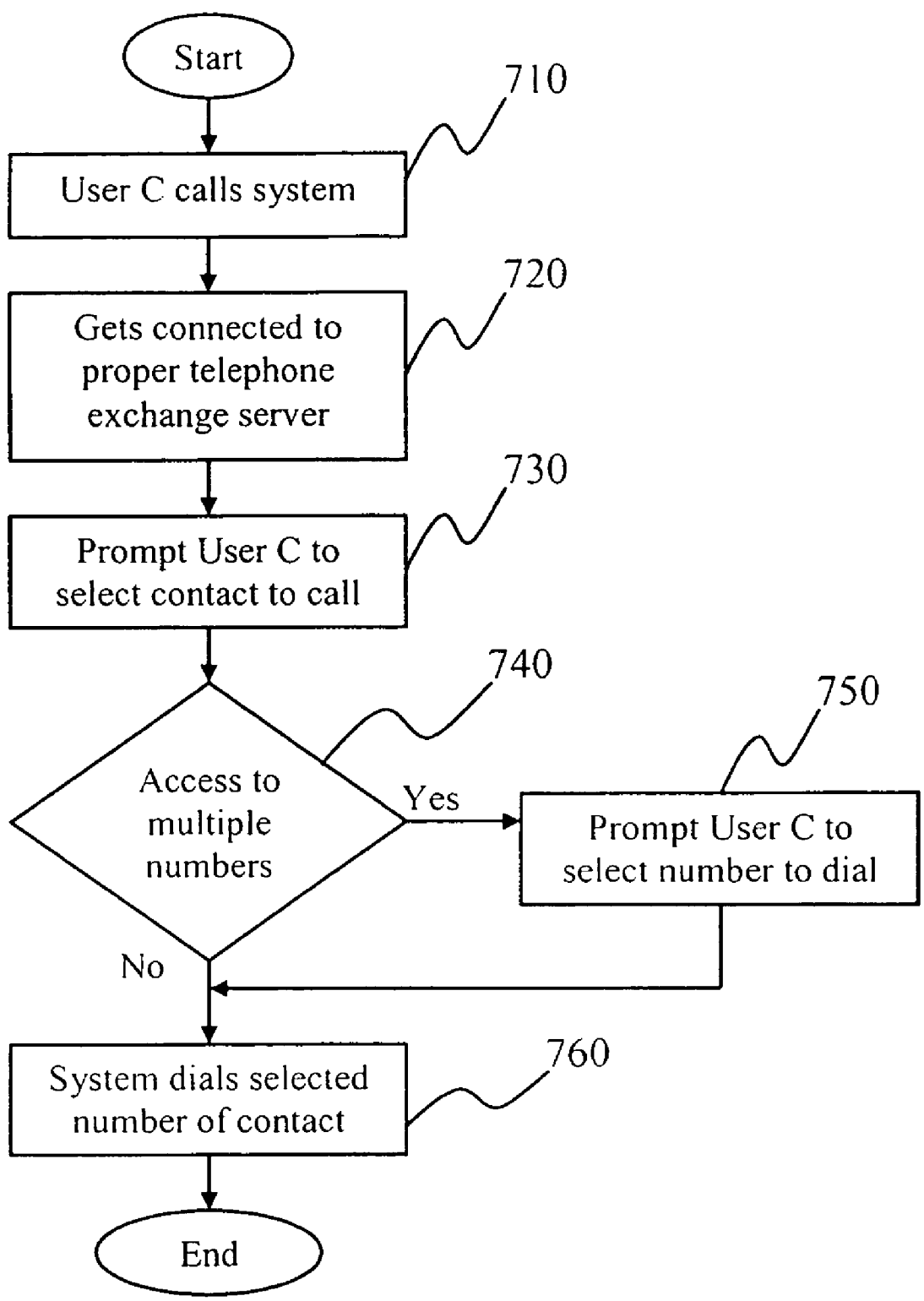
FIG. 7 is a flowchart of an exemplary method of using the system to place a telephone call.

FIG. 7 shows a flow diagram illustrating an example of how this contact information system is utilized by a user to make a telephone call. In this example, User C wants to place a call to User A. At step 710, User C uses a telephone device 582 to access the contact information system. User C may have a hot-key, such as *2 or other shortcut that provides quick access to the contact information system for making telephone calls. User C goes through the verification process when accessing the contact information system.

At step 720, when User C gains access to the contact information system, User C is connected to the local telephone exchange 570 associated with User C, which for the above scenario would be the telephone exchange 570 for area code 302. The local telephone exchange 570 associated with User C then accesses the local server computing device 560 associated with the telephone exchange 570 for area code 302.

At step 730, the contact information system prompts User C to select one of the users that has granted access rights to User C. User C makes a selection of one of those users, which in this case is User A.

At step 740, the contact information system checks the local server computing device 560 to determine whether User C has access rights to multiple phone numbers of User A. If User C has been granted access rights to multiple phone numbers of User A, then control is transferred to step 750, otherwise control is transferred to step 760. In the above scenario, User C has access rights to two of User A's telephone numbers: User A's home telephone number and User A's cellular telephone number.

At step 750, the contact information system prompts User C to select one of the multiple telephone numbers of User A to which User C has access rights, and waits for User C to make a selection of the desired telephone number of User A for the contact information system to call.

At step 760, the contact information system dials the telephone number of User A and connects User C to User A.

Note that this phone number is kept up to date by User A using the process described in FIG. 6. It is not up to a user to update the contact information of other users, rather it is up to each user to keep their own personal contact information up to date.

From the above description, it should be clear to those skilled in the art that the client computing device 580 could not only be implemented by a computer device but also by a telephone with very limited computing capability. Using a voice prompt system with menus, the contact information system can present a user with the necessary interface for using a simple telephone as the client computing device 580. It will be clear to those skilled in the art that the client computing device 580 and the telephone device 582 could be integrated in one device or be separate devices.

The contact information system allows a plurality of users to update their contact information and make it accessible to a selected subset of other users through the use of access rights. The aspects of the contact information system described in FIGS. 6 and 7 can also be applied to other personal and contact information that is stored in the local server computing devices 560 and is accessible through the client computing devices 580 of the users.

The foregoing description of the invention is illustrative only, and is not intended to limit the scope of the invention to the precise terms set forth. Although the invention has been described in detail with reference to certain illustrative embodiments, variations and modifications exist within the scope and spirit of the invention as described and defined in the following claims.

What is claimed is:

1. A personal information system, comprising:
   a server computer system, having memory storing first user's personal information associated with a first user, and to store information about which of a plurality of other users, other than said first user, have been granted access rights to said first user's personal information;
   said server computer detecting a first change in said first user's personal information to updated first personal information;
   said server computer system operating to determine locations of said plurality of other users and determines locations of first server computer systems which are local to said plurality of other users, and updates said first server computer systems to have said updated first information and to provide said updated first information to said plurality of other users, and
   said server computer system determining second server computer systems which are not local to any of said plurality of other users, and not providing said updated first information to said second server computer systems.

2. The system as in claim 1, wherein said server computer system determines a list of said plurality of other users, and location information associated with said plurality of other users, each said location information indicating a location of one of said other users, and wherein said location information is used by said server computer system to find said other server computer systems, where said other server computer systems are computer systems which are local to said location.

3. The system as in claim 2, wherein said location information comprises information about a telephone exchange of said other users.

4. The system as in claim 1, wherein said stored information comprises information about said other server computer systems which are local to said plurality of other users who are authorized to have updated information.

5. The system as in claim 4, wherein said server computer determines said first server computer systems by also determining if users among said plurality of other users have subscribed to an update service, and updates only said first server computer systems which are local to users who have been granted access rights to said first user's personal information, and have subscribed to said update service and does not update second server computer systems which are not local to any of said plurality of other users who have subscribed to said update service.

6. The system as in claim 1, wherein said server computer stores information about an amount of access rights to the first user's personal information which has been granted to users, where a second user is stored associated with a first category, where based upon said first category, said server computer permits said second user to access a first amount of the first user's personal information, and a third user is stored associated with a second category, wherein based upon said second category, said server computer permits said third user to access a second amount of the first user's personal information, wherein said first amount is different than said second amount.

7. The system of claim 6 wherein the second user is not permitted to access the second amount of the first user's personal information.

8. The system of claim 1 wherein the first user's personal information stored in the memory comprises multiple different image data files associated with said first user.

9. The system of claim 8, wherein said server computer stores information about an amount of access rights to the first user's personal information which has been granted to users, where a second user is stored associated with a first category, where based upon said first category, said server computer permits said second user to access a first amount of the user's information including said image files, and to obtain updates to said image files, and where a third user is stored associated with a second category, wherein based upon said second category, said server computer permits said third user to access a second amount of the first user's personal information, wherein said second amount of said information does not include said image files.

10. A personal information system, comprising:
   a server computer system, having memory storing a first user's personal information, and to store information about which of a plurality of other users, other than said first user, have been granted access rights to said first user's personal information;
   said server computer detecting a first change in said first user's personal information to updated first personal information;
   said server computer system operating to provide said updated first information to said plurality of other users, wherein said server computer stores information about an amount of access rights to the first user's personal information which has been granted to users, where a second user is stored associated with a first category, where based upon said first category, said server computer permits said second user to access a first amount of the first user's personal information, and a third user is stored associated with a second category, wherein based upon said second category, said server computer permits said third user to access a second amount of the first user's personal information, wherein said first amount is different than said second amount, said server computer system operating to determine locations of said plurality of other users and determines locations of first server computer systems which are local to said plurality of other users, and updates said first server computer systems to have said updated first information and to provide said updated first information to said plurality of other users, and said server computer system determining second server computer systems which are not local to any of said plurality of other users, and not providing said updated first information to said second server computer systems.

11. The system as in claim 10, wherein said server computer system only updates some of said other server computer systems based on stored information.

12. The system as in claim 10, wherein said stored information comprises information about said other server computer systems which are local to said plurality of other users who are authorized to have updated information.

13. The system as in claim 12, wherein said stored information is based on said server computer determining if users among said plurality of other users have subscribed to an update service, wherein said server computer determines said first server computer systems by also determining if users among said plurality of other users have subscribed to said update service, and updates only those other server computer systems which are local to users who have been granted access rights to said first user's information, and have subscribed to said update service and does not update second server computer systems which are not local to any of said plurality of other users who have subscribed to said update service.

14. The system as in claim 10, wherein said server computer system determines a list of said plurality of other users, and location information associated with said plurality of other users, each said location information indicating a location of one of said other users, and wherein said location information is used by said server computer system to find said other server computer systems, where said other server computer systems are computer systems which are local to said location.

15. The system as in claim 14, wherein said location information comprises information about a telephone exchange of said other users.

16. The system of claim 10 wherein the first user's personal information stored in the memory comprises multiple different image data files associated with said first user.

17. The system of claim 16 wherein the first user receives updates to the image data files and the second user does not receive updates to the image data files.

18. A system for selectively enabling a second user access to a first user's personal information, wherein said system comprises memory for storing said first user's information and for storing a plurality of programmatic instructions, wherein said instructions comprise:

a. instructions for electronically assigning the second user to a first named group based upon an instruction from said first user;

b. instructions for electronically assigning other users to a second named group based upon instructions from said first user;

c. instructions for permitting said second user to access multiple different image files associated with said first named group and for preventing said second user from accessing said multiple different associated with said second named group;

d. instructions for permitting said second user to update of said first user's information to updated first information; and e. instructions for determining locations of said other users and first server computer systems and to update said first server computer systems which are local to said other users to have said updated first information and said instructions determining locations of second server computer systems which are not local to any of said plurality of other users, and not providing said updated first information to said second server computer systems.

19. The system of claim 18 wherein, the system further permits the other users to access said updated first user's information.

20. The system of claim 18 wherein the system controls defining which of said first user's personal information is accessible by users assigned to said first named group and said second named group.

21. The system as in claim 18, wherein said stored information comprises information about said other server computer systems which are local to said other users who are authorized to have updated information.

22. The system as in claim 21, wherein said stored information is based on said server computer determining said first server computer systems by also determining if users among said other users have subscribed to an update service, and updates only said first server computer systems which are local to users who have been granted access rights to said first user's information, and have subscribed to said update service and does not update second server computer systems which are not local to any of said plurality of other users who have subscribed to said update service.

23. The system as in claim 18, wherein said system determines a list of said plurality of other users, and location information associated with said other users, each said location information indicating a location of one of said other users, and wherein said location information is used by said system to find other server computer systems, where said other server computer systems are computer systems which are local to said location.

24. The system as in claim 23, wherein said location information comprises information about a telephone exchange of said other users.

25. The system of claim 18 wherein the first user's personal information stored in the memory comprises multiple different image data files associated with said first user.

26. The system of claim 25 wherein the first user receives updates to the image data files and the second user does not receive updates to the image data files.

27. A personal information system, comprising:

a server computer system, having memory storing a first user's personal information including multiple different photographs that have been provided by the first user, and to store information about which of a plurality of other users, other than said first user, have been granted access rights to said first user's personal information;

said server computer detecting a first change in said first user's personal information to updated first personal information;

said server computer system operating to provide said updated first information to said plurality of other users, wherein said server computer stores information about an amount of access rights to the first user's personal information which has been granted to users, where a second user is stored associated with a first category, where based upon said first category, said server computer permits said second user to access a first amount of the first user's personal information including said photographs, and a third user is stored associated with a second category, wherein based upon said second category, said server computer permits said third user to access a second amount of the first user's personal information that does not include said photographs, said server computer system operating to determine locations of said plurality of other users and determines locations of first server computer systems which are local to said plurality of other users, and updates said first server computer systems to have said updated first information and to provide said updated first information to said plurality of other users, and said server computer system determining second server computer systems which are not local to any of said plurality of other users, and not providing said updated first information to said second server computer systems.

28. The system as in claim 27, wherein said stored information comprises information about said other server computer systems which are local to said plurality of other users who are authorized to have updated information.

29. The system as in claim 28, wherein said stored information is based on said server computer determining said first server computer systems by also determining if users among said plurality of other users have subscribed to an update service, and updates only those other server computer systems which are local to users who have been granted access rights to said first user's information, and have subscribed to said update service and does not update second server computer systems which are not local to any of said plurality of other users who have subscribed to said update service.

30. The system as in claim 27, wherein said server computer system determines a list of said plurality of other users, and location information associated with said plurality of other users, each said location information indicating a location of one of said other users, and wherein said location information is used by said server computer system to find said other server computer systems, where said other server computer systems are computer systems which are local to said location.

31. The system as in claim 30, wherein said location information comprises information about a telephone exchange of said other users.

\* \* \* \* \*